(12) United States Patent
Majidi et al.

(10) Patent No.: US 10,336,042 B2
(45) Date of Patent: Jul. 2, 2019

(54) COMPOSITION, SYSTEM, AND METHOD FOR RIGIDITY TUNING WITH CONDUCTIVE THERMOPLASTIC ELASTOMER

(71) Applicant: CARNEGIE MELLON UNIVERSITY, a Pennsylvania Non-Profit Corporation, Pittsburgh, PA (US)

(72) Inventors: Carmel Majidi, Pittsburgh, PA (US); Wanliang Shan, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 0 days.

(21) Appl. No.: 15/423,551

(22) Filed: Feb. 2, 2017

(65) Prior Publication Data

US 2017/0217139 A1 Aug. 3, 2017

Related U.S. Application Data

(60) Provisional application No. 62/388,606, filed on Feb. 2, 2016.

(51) Int. Cl.
*B32B 1/04* (2006.01)
*B32B 27/08* (2006.01)
(Continued)

(52) U.S. Cl.
CPC ........... *B32B 27/08* (2013.01); *B32B 3/04* (2013.01); *B32B 27/20* (2013.01); *B32B 27/283* (2013.01);
(Continued)

(58) Field of Classification Search
CPC .......... B32B 3/04; B32B 27/20; B32B 27/08; B32B 27/32; B32B 2264/108; B32B 2307/51; B32B 2307/54; B32B 2307/50; C08F 10/02; C08F 10/06; C08F 110/02; C08F 110/06; C08F 2800/00; C08F 2800/10; C08F 2800/20; C08L 23/16;
(Continued)

(56) References Cited

U.S. PATENT DOCUMENTS

| | | | | |
|---|---|---|---|---|
| 4,585,578 A | * | 4/1986 | Yonahara | ............... C08K 3/04 252/182.1 |
| 4,791,144 A | * | 12/1988 | Nagou | .................. C08J 5/18 210/500.36 |

(Continued)

OTHER PUBLICATIONS

Zhang et al. "Percolation threshold and morphology of composites of conducting carbon black/polypropylene/EVA", 2004, Journal of Material Science, vol. 39, pp. 1751-1757, (Year: 2004).*

(Continued)

*Primary Examiner* — Maria V Ewald
*Assistant Examiner* — Zachary M Davis
(74) *Attorney, Agent, or Firm* — Michael G. Monyok (57) ABSTRACT

Disclosed herein is a composite comprising a conductive elastomer and an isolating elastomer. When a current is passed through the conductive elastomer, its tensile modulus decreases as the elastomer heats from internal Joule heating, changing the rigidity of the composite. When the current is no longer present, the elastomer cools and the rigidity of the composite returns to its original state.

11 Claims, 7 Drawing Sheets

(51) Int. Cl.
  *B32B 27/20* (2006.01)
  *B32B 27/28* (2006.01)
  *B32B 27/32* (2006.01)
  *B32B 3/04* (2006.01)
  *H01B 1/06* (2006.01)

(52) U.S. Cl.
  CPC .............. *B32B 27/32* (2013.01); *H01B 1/06* (2013.01); *B32B 2250/02* (2013.01); *B32B 2250/24* (2013.01); *B32B 2250/40* (2013.01); *B32B 2264/105* (2013.01); *B32B 2264/108* (2013.01); *B32B 2274/00* (2013.01); *B32B 2307/202* (2013.01); *B32B 2307/206* (2013.01); *B32B 2307/30* (2013.01); *B32B 2307/51* (2013.01); *B32B 2307/54* (2013.01); *B32B 2457/00* (2013.01)

(58) Field of Classification Search
  CPC .......... C08L 23/04; C08L 23/06; C08L 23/08; C08L 23/10; C08L 23/12; C08L 23/14; H01B 1/06; H01B 1/20; H01B 1/24; H01B 3/30; H01B 3/46; H01B 7/0009
  See application file for complete search history.

(56) References Cited

U.S. PATENT DOCUMENTS

| | | | | |
|---|---|---|---|---|
| 2010/0171393 | A1* | 7/2010 | Pei | H01L 41/094 310/330 |
| 2015/0129276 | A1* | 5/2015 | Shumaker | H01B 1/22 174/69 |
| 2016/0193810 | A1* | 7/2016 | Kang | B32B 15/092 428/418 |

OTHER PUBLICATIONS

Bak. C, "Resistivity: the fine art of measuring electrical resistance." Fabrico, 2012.
Balasubramanian, A. et al. "Microfluidic thermally activated materials for rapid control of macroscopic compliance." Advanced Functional Materials 24, No. 30 (2014): 4860-4866.
Brown, E. et al. "Universal robotic gripper based on the jamming of granular material." Proceedings of the National Academy of Sciences 107, No. 44 (2010): 18809-18814.
Capadona, J. R. et al. "Stimuli-responsive polymer nanocomposites inspired by the sea cucumber dermis." Science 319, No. 5868 (2008): 1370-1374.
Chen, J. Z. et al. "Design, testing and control of a magnetorheological actuator for assistive knee braces." Smart Materials and Structures 19, No. 3 (2010): 035029.
Chenal, T. et al., In Proceedings of IEEE/RSJ International Conference on Intelligent Robots and Systems, 2014.
Cheng, N.G. et al. "Thermally Tunable, Self-Healing Composites for Soft Robotic Applications." Macromolecular Materials and Engineering 299, No. 11 (2014): 1279-1284.
Clark, W. W. et al. "Modeling of a high-deformation shape memory polymer locking link." In Proc. SPIE, vol. 7645, p. 764507. 2010.
Culha, U. et al. Submitted to Sensors, 2014.
Haines, C. S., et al. "Artificial muscles from fishing line and sewing thread." science 343, No. 6173 (2014): 868-872.
Han, H. et al. "Active muscle stiffness sensor based on piezoelectric resonance for muscle contraction estimation." Sensors and Actuators A: Physical 194 (2013): 212-219.
Henke, M. et al. "Multi-layer beam with variable stiffness based on electroactive polymers." In Electroactive Polymer Actuators and Devices (EAPAD) 2012, vol. 8340, p. 83401P. International Society for Optics and Photonics, 2012.
Kier, W. M. "The diversity of hydrostatic skeletons." Journal of Experimental Biology 215, No. 8 (2012): 1247-1257.
Lu, T. et al. "Rapid Prototyping for Soft-Matter Electronics." Advanced Functional Materials 24, No. 22 (2014): 3351-3356.
Majidi, C. et al. "Tunable elastic stiffness with microconfined magnetorheological domains at low magnetic field." Applied Physics Letters 97, No. 16 (2010): 164104.
McEvoy, M. A. et al. "Thermoplastic variable stiffness composites with embedded, networked sensing, actuation, and control." Journal of Composite Materials 49, No. 15 (2015): 1799-1808.
McKnight, G. et al. Intelligent Mater. Syst. Struct., 21:1783-1793, 2010.
Motokawa, T. "Connective tissue catch in echinoderms." Biological Reviews 59, No. 2 (1984): 255-270.
Pratt, G. A. et al. "Series elastic actuators." In Intelligent Robots and Systems 95.'Human Robot Interaction and Cooperative Robots', Proceedings. 1995 IEEE/RSJ International Conference on, vol. 1, pp. 399-406. IEEE, 1995.
Schubert, B. E. et al. "Variable stiffness material based on rigid low-melting-point-alloy microstructures embedded in soft poly (dimethylsiloxane)(PDMS)." RSC Advances 3, No. 46 (2013): 24671-24679.
Shan, W. et al. "Soft-matter composites with electrically tunable elastic rigidity." Smart Materials and Structures 22, No. 8 (2013): 085005.
Shan, W. L. et al. "Thermal analysis and design of a multi-layered rigidity tunable composite." International Journal of Heat and Mass Transfer 66 (2013): 271-278.
Shanmuganathan, K. et al. "Biomimetic mechanically adaptive nanocomposites." Progress in Polymer Science 35, No. 1 (2010): 212-222.
Trappe, V. et al. "Jamming phase diagram for attractive particles." Nature 411, No. 6839 (2001): 772-775.
Varga, Z. et al. "Magnetic field sensitive functional elastomers with tuneable elastic modulus." Polymer 47, No. 1 (2006): 227-233.

\* cited by examiner

COMPOSITION, SYSTEM, AND METHOD FOR RIGIDITY TUNING WITH CONDUCTIVE THERMOPLASTIC ELASTOMER

CROSS-REFERENCE TO RELATED APPLICATIONS

This application claims the benefit under 35 U.S.C. § 119 of Provisional Application Ser. No. 62/388,606, filed Feb. 2, 2016, which is incorporated herein by reference.

STATEMENT REGARDING FEDERALLY SPONSORED RESEARCH

This invention was made with government support under the United States Navy Number N66001-12-4255. The government has certain rights in this invention.

BACKGROUND OF THE INVENTION

The invention relates generally to a composition capable of rigidity tuning. More specifically, the invention relates to a composite comprising a conductive elastomer that reversibly changes rigidity through the use of an electrical current.

Materials capable of rapid and reversible changes in mechanical rigidity have applications ranging from nature to engineered systems. Natural organisms typically perform rigidity tuning with internal structures such as striated muscle or hydroelastic skeletons. These natural composites and structures are lightweight and require only ~0.1-1 seconds to change their tensile rigidity by 1-2 orders of magnitude. In engineered systems, rigidity tuning is often accomplish with external hardware and finds applications from damping/vibration control, active orthoses, robotic grippers, artificial muscles, and wearable technology.

Rigidity tuning allows a material to remain elastic at times, while providing support at other times. In an elastic material, the maximum mechanical stress that the material can support is approximately proportional to its elastic (Young's) modulus (E). Therefore, an elastomer with a modulus of 1 MPa can only exhibit approximately 1/1000th the load-bearing capability of a rigid plastic (~1 GPa). Nature deals with the challenge of providing elasticity and support through materials like muscle and catch connective tissue, natural materials that actively change their elastic rigidity by tuning the internal sliding friction between inextensible myofilaments and collagen fibers, respectively.

For engineered systems, the external hardware used to change rigidity can be appropriate for relatively large machinery, but these mechanisms cannot be easily scaled for clothing-embedded technologies, small-scale robotics, and other applications that depend on miniaturization and autonomous operation. Examples of such hardware include pumps and valves for gel hydration or pneumatic particle jamming, electromagnets for activating magnetorheological fluids and elastomers, and high voltage activation for electroactive polymers.

Alternatively, efforts have been made to utilize thermal activation of non-conductive shape memory polymers, thermoplastics, coiled fibers, wax-soaked thermoplastics, and low-melting-point alloys. Many of these materials use an external heating element or employ direct Joule heating, such as microfluidic channels of liquid-phase metals, including gallium-indium (GaIn) alloy to reach a glass transition or melting temperature. While promising in certain applications, the separate Joule heating element must remain electrically functional during elastic deformation and mechanical load. In addition, the use of liquid GaIn introduces sealing issues and requires separation from the thermally-responsive material, adding layers and sources of heat dissipation to the composite.

In the techniques mentioned above, external hardware or the use of low-melting point alloys create complications for many applications. It would therefore be advantageous to develop a rigidity tunable composite that does not rely on liquid metals or bulky hardware to accomplish changes in rigidity.

BRIEF SUMMARY

According to embodiments of the present invention is a composite comprised of a conductive elastomer disposed within an electrically-isolating elastomer. In one example embodiment, a conductive propylene-based elastomer (cPBE) that changes its rigidity when activated with electric current is embedded in an electrically insulating sheet of polydimethylsiloxane (PDMS). Because the conductive elastomer is flexible and conductive, it can be directly heated with electrical current and stretched without mechanical or electrical failure. Activation with electrical current causes the conductive elastomer to soften as its temperature rises, thus changing the rigidity of the composite.

In various embodiments, the composite can reversibly change its tensile modulus between about 1 and 100 MPa, thus exceeding the rigidity tuning properties of natural materials such as skeletal muscle and catch connective tissue. Further, the change in modulus is rapid and reversible—the modulus of the composite changes in seconds with moderate electrical power. Unlike other systems, the composite is lightweight, inexpensive, and can be patterned with a laser, for example, into any shape or circuit geometry. In addition, the rigidity of the composite can be varied by adjusting the volume fraction (x) of the conductive elastomer to the electrically isolating elastomer.

Further, according to one embodiment, a method of fabricating the device comprises mixing a conductive filler into an elastomer to form the conductive elastomer, forming the conductive elastomer, cutting a sheet of the conductive elastomer into a desired pattern, and encasing it in an electrically isolating elastomer. Depending on the application, the materials can be patterned using a laser cutting system.

DETAILED DESCRIPTION

Figure 1:
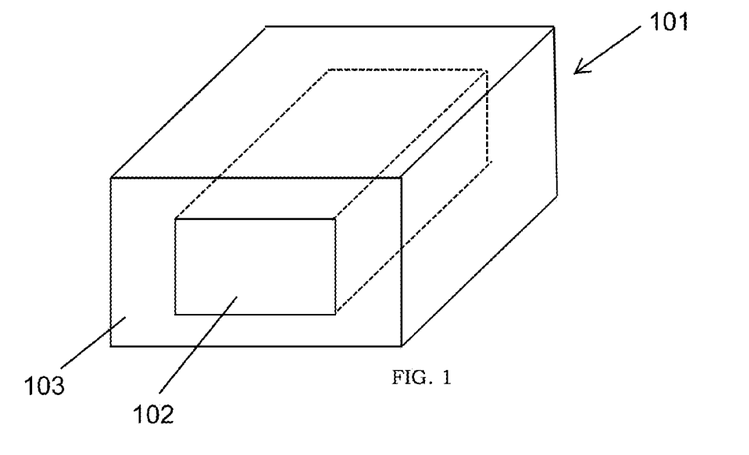
FIG. 1 depicts the composite according to one embodiment.

According to one embodiment of the present invention is a composite 101 having tunable rigidity, where the composite 101 comprises a conductive elastomer 102 encased in an electrically-isolating elastomer 103, as shown in FIG. 1. In one example embodiment of the composite 101, the conductive elastomer 102 comprises 51/9/40 weight % of propylene, ethylene, and structured carbon black and the electrically-isolating elastomer 103 comprises poly(dimethylsiloxane) (PDMS). In this example, the carbon black—acting as a conductive filler 104—is interspersed within the propylene/ethylene elastomer 111, creating a percolating network and thus providing conductivity through the conductive elastomer 102. Other conductive fillers 104, such as metal powders, carbon allotropes (e.g. exfoliated graphite and carbon nanotubes), and other conductive materials can be used. A person having skill in the art will appreciate that the composition of the conductive elastomer 102 can affect its softening temperature and rigidity in the activated and inactivated states. Block copolymer elastomers, propylene-based elastomers (e.g. propylene-ethylene copolymers), ethylene-butene copolymers (e.g. Dupont™ Fusabond®), and other similar elastomers can also be used in the composite 101. When these elastomers are used to construct the electrically-isolating elastomer 103, the conductive filler 104 is not used to prevent conduction through the entire composite 101.

By creating a conductive path through the conductive elastomer 102, electrical current can be used to induce direct Joule heating (or resistive heating) in the elastomer 102, raising the temperature of the material. The rising temperature of the conductive elastomer 102 will ultimately cause it to soften. Referring again to the example embodiment using cPBE as the conductive elastomer 102, the cPBE softens dramatically and the effective tensile modulus of the composite 101 decreases when heated to a critical softening temperature of about $T_s = 75°$ C. This change in rigidity is reversible and can be controlled in seconds by applying a voltage drop across either the faces or terminal ends of a flat cPBE strip, for example.

The ultimate rigidity of the composite 101 is dependent on the ratio of conductive elastomer 102 to isolating elastomer 103 used. More specifically, the rigidity change $\Gamma$ can be controlled by the area fraction $x = A_{CE}/A$, which is defined as the ratio of the cross-sectional area of the embedded conductive elastomer 102 ($A_{CE}$) to that of the composite 101 (A). In general, $\Gamma$ is expected to be approximately:

$$\Gamma = \frac{E_{eff}^n}{E_{eff}^a} = \left(\frac{\chi}{1-\chi}\right)\frac{E_{CE}}{E_{IE}} + 1$$

where $E_{eff}^n = \chi E_{CE} + (1-\chi)E_{IE}$ and $E_{eff}^a = (1-\chi)E_{IE}$ are the effective tensile moduli of the non-activated and activated composite 101, respectively. This approximation for $\Gamma$ assumes that the activated conductive elastomer 102 has negligible stiffness and is therefore undefined in the limit as $X \to 1$. Using these ratios, the change in rigidity of the composite 101 can be adjusted for a particular application.

Figure 2:
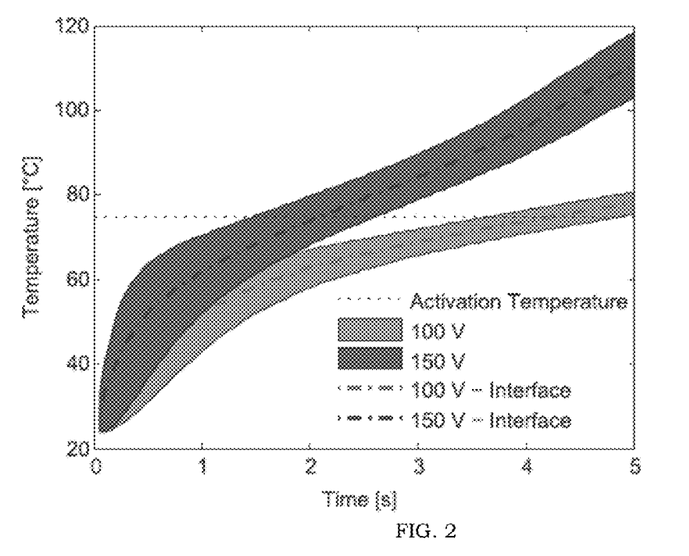
FIG. 2 is a graph showing temperature as a function of activation time.
Figure 3:
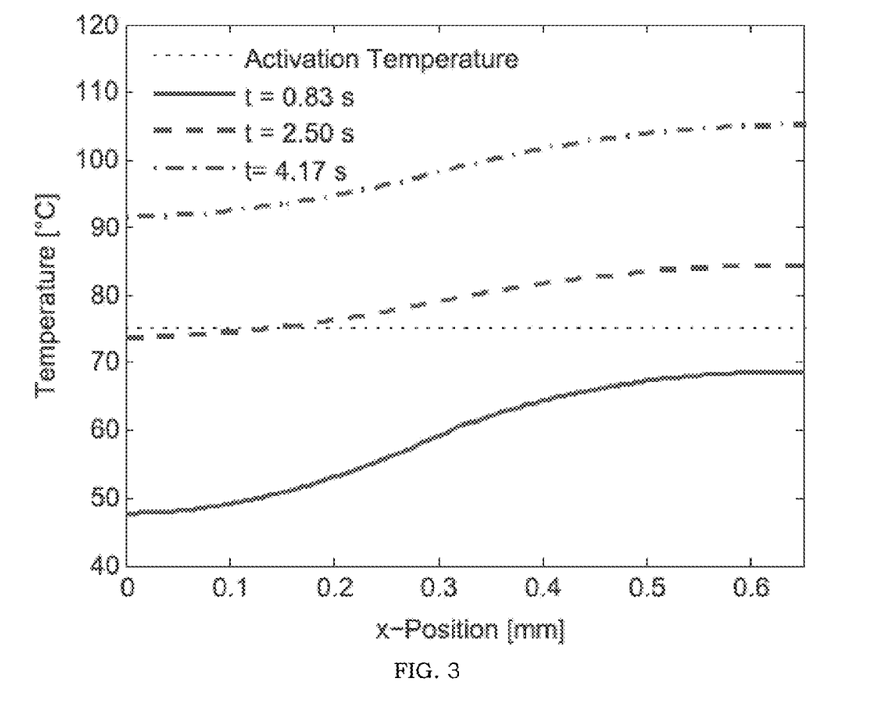
FIG. 3 is a graph showing temperature as a function of position within the composite.

In the example embodiment, the cPBE-PDMS composite 101 takes approximately 2 and 4 seconds for the cPBE to heat above $T_s$ for applied voltages of 150 V and 100 V, respectively. The temperature is greatest at the mid-plane of the composite 101 and decreases smoothly and monotonically towards the surface. For example, with a voltage of 150 V, the temperature at the boundary is approximately 65° C. at the time of complete activation. Moreover, for high input voltages the temperature in the cPBE layer of the composite 101 is significantly higher than in the PDMS layer, due to the relatively fast heating. This temperature gradient is less pronounced at lower voltages, which has important implications for applications involving contact with human skin. FIGS. 2-3 show the temperature profile as function of activation time and position.

Also affecting the temperature profile is the overall size of the composite 101. The surface temperature at the time of complete activation of the conductive elastomer 102 is minimized for a larger composite 101 thicknesses and a lower fraction of cPBE. This can be attributed to an improved thermal insulation due to the thicker PDMS seal. In addition to affecting the temperature profile, the composition of the composite 101 affects the activation time—or the time between rigid and softened states. The activation time decreases significantly with a higher volume % of the conductive elastomer 102 and/or smaller thickness of the conductive elastomer 102 layer.

Figure 8:
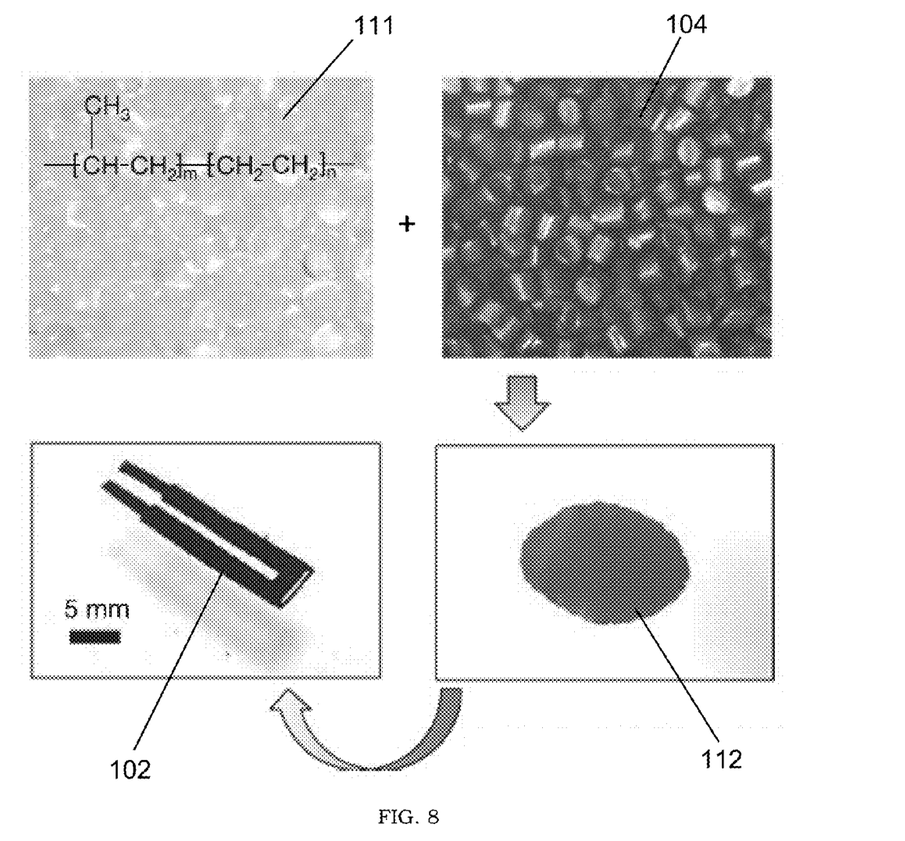
FIG. 8 is a chart of various stages of the fabrication process.

Fabrication of the composite 101, according to one embodiment, comprises the steps of mixing the components of the conductive elastomer 102, forming the conductive elastomer 102 into a desired shape (i.e flat sheet, cylinder, etc.), and then sealing the conductive elastomer 102 with the isolating elastomer 103. A flowchart of this process is shown in FIG. 8, where pellets of the elastomer 111 and conductive filler 104 are formed into a sheet 112, before being encased with the isolating elastomer 103, thus forming final composite 101. By way of further example, when the components of the conductive elastomer 102 are supplied as pellets, they are pressed between steel plates at 90° C. to form thin sheets. Based on the intended use or application, the composition, shape, and size of the conductive elastomer 102 can be varied.

Once formed, the conductive elastomer 102 can be cut or shaped according to a variety of techniques. In one embodiment, flat sheets 112 of conductive elastomer 102 are rapidly patterned with a laser cutting system, such as a $CO_2$ laser. This allows for any planar geometries with ≥100 μm feature sizes to be produced in seconds. To achieve smaller features, the conductive elastomer 102 could be patterned with either a UV laser micromachining systems or through replica casting using a micromachined mold. After the conductive elastomer 102 is patterned and the excess material is removed, the conductive elastomer 102 is sealed with the isolating elastomer 103. A sample composite 101 fabricated according to this embodiment has total dimensions of 40×7.5×1.25 mm and contains a single U-shaped 2×0.65 mm strip of cPBE that has a total length of 78 mm.

To assess the mechanical properties of the composite 101, rigidity tuning measurements are performed on the sample of composite 101. Stress-strain curves for the non-activated composite 101, activated composite 101, and homogenous insulating elastomer 103, and homogenous conductive elastomer 102 are measured. Using a least-squares algorithm, the curves for the isolating elastomer 103 samples (such as PDMS), conductive elastomers 102 samples (such as cPBE), and non-activated composites 101 are fitted with a five-term expansion of the Ogden model for uniaxial stress.

$$\sigma_{Ogden} = \sum_{l=1}^{n=5} \mu_p (\lambda^{2p} - \lambda^{-p})$$

In contrast, stress-strain data for the activated composites were fitted with a line. The effective Young's moduli $E_{ff}^\beta$ of the conductive elastomer 102, isolating elastomer 103, and composite 101 were determined by averaging the moduli derived from the measured stress-strain curves. Here, the superscript $\beta \in \{n, a\}$ denotes whether the composite 101 is non-activated and at room temperature (n) or activated with the conductive elastomer 102 heated above its transition temperature, i.e. softening point, $T_s$ (a).

Figure 4:
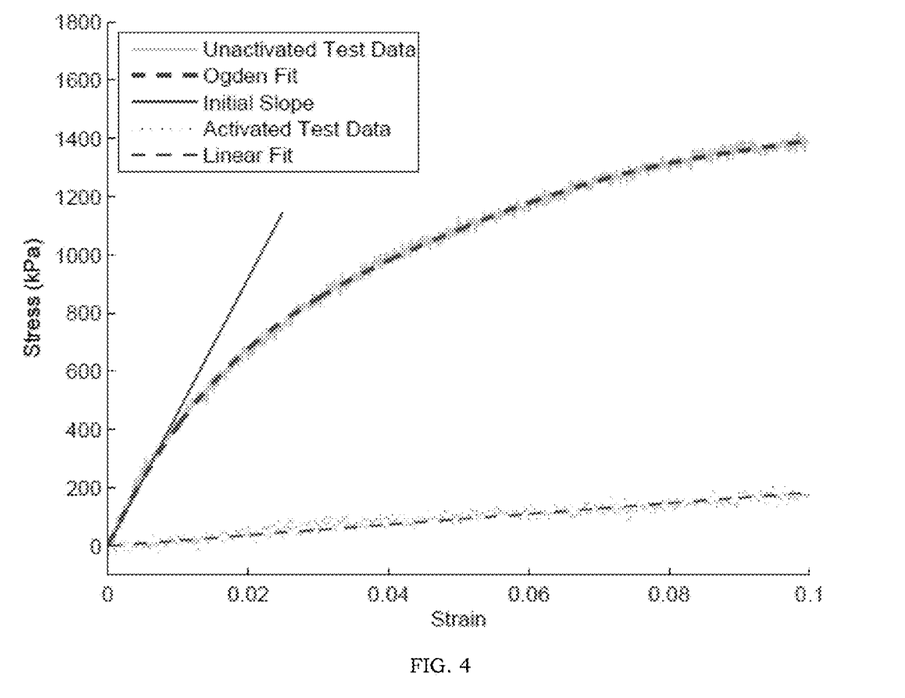
FIG. 4 is a stress/strain curve of the composite.

Representative stress-strain results for a single pair of activated and non-activated composites 101 tests are presented in FIG. 4, where cPBE is used as the conductive elastomer 102 and PDMS is used as the isolating elastomer 103. Based on the tensile testing results for all of the samples, $E_{\it{eff}}^n$=36.8 MPa (st. dev.=9.0 MPa) and $E_{\it{eff}}^a$=1.49 MPa (st. dev.=0.44 MPa). This represents a $\Gamma$=25× change in tensile rigidity. For illustration, this is approximately the same as the difference between leather and a rubber band. The values $E_{CE}$=175.5 MPa (st. dev.=23.7 MPa) and $E_{IE}$=1.041 MPa (st. dev.=0.188 MPa) correspond to the Young's modulus of the cPBE and PDMS at room temperature, respectively, and are independently obtained from tensile tests performed on homogeneous material specimens.

Figure 5:
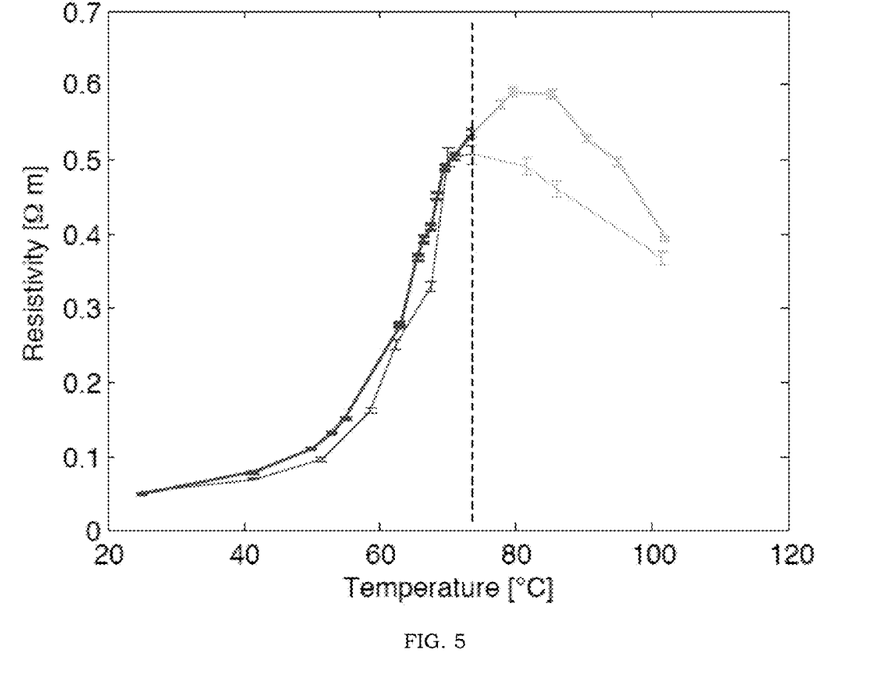
FIG. 5 is a graph showing the changes in resistivity as the temperature of the composite changes.

A key feature of the conductive elastomer 102 is its ability to maintain conductivity even in its softened state. As shown in FIG. 5, electrical resistance increases exponentially with increasing temperature. The roughly one order of magnitude increase in electrical resistivity is advantageous because it results in a self-limiting reduction in electrical power delivered to the composite 101 when a fixed voltage is applied. This prevents burning or degradation of the conductive elastomer 102 and eliminates the need for timed activation or control.

Figure 6:
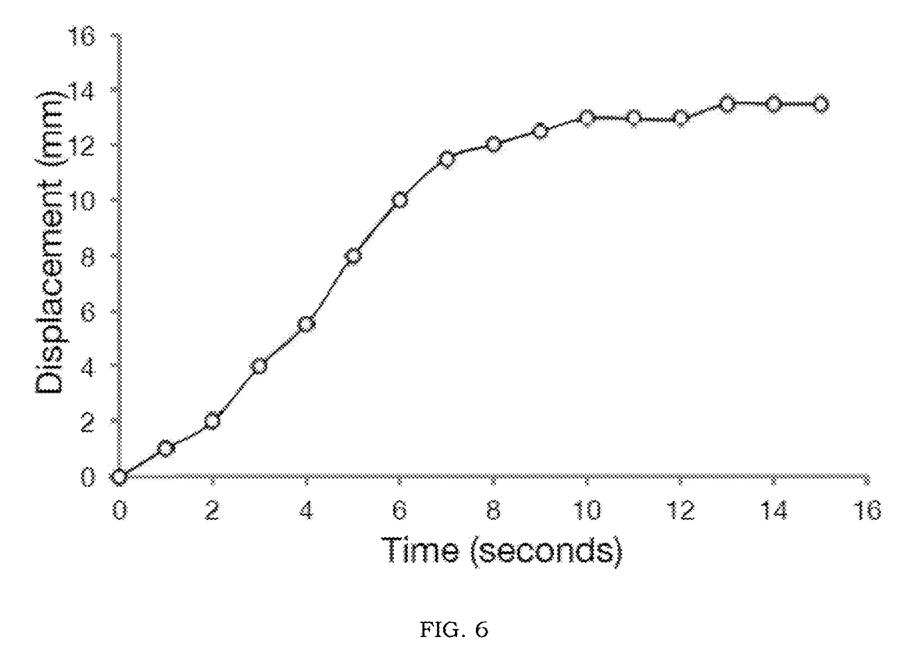
FIG. 6 is a graph showing the displacement of the composite which is support a weight as a function of time.

To estimate the activation time, the elongation of the composite 101 under a deadweight loading was examined. As shown in FIG. 6, a sample of composite 101 supporting a 0.5 kg weight (P=4.9 N) elongates by approximately 40% within seconds of activation. The sample is activated with approximately 0.17-3.3 W of electrical power under 100 V of fixed voltage (resistance increased from 3 to 60 k$\Omega$ and current decreased from 33 to 1.7 mA). Displacement appears to increase linearly with time for approximately 6-7 seconds. Subsequently, the sample of composite 101 exhibits creep for several seconds as the displacement converges to its final value of 13 mm. In this example, the sample has a length L=34 mm, cross-sectional area A=9.38 mm$^2$, and cross-sectional area fraction x=0.277 of conductive elastomer 102. A displacement u=13 mm implies that the composite has an effective modulus of $$E_{\it{eff}}^a = \frac{PL}{uA} = 1.4 \text{ MPa}.$$

Figure 7:
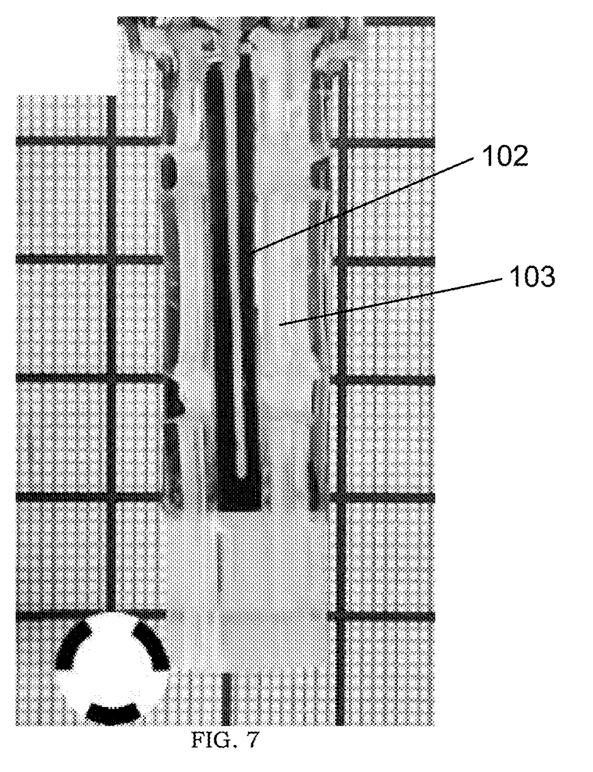
FIG. 7 depicts a device incorporating the composite, according to one embodiment.

In one example application of the invention, the composite 101 is incorporated into a soft pneumatic finger composed of PDMS 'phalanges,' soft silicone elastomer joints, and conductive elastomer 102 'tendons' constructed of cPBE, as shown in FIG. 7. The PDMS and soft silicone are composed of Sylgard 184 (Dow Corning, Inc.) and Ecoflex 0030 (Smooth-on, Inc.), respectively. Both segments are produced with elastomer casting using 3D printed molds (Objet 24; Stratasys, Ltd.). After curing, the PDMS and Ecoflex segments are attached and a tube is inserted into the bottom. Next, U-shaped conductive elastomer 102 tendons are attached to the top and bottom segments of PDMS using uncured PDMS as an adhesive. A voltage of 150 V was applied across each of the cPBE tendons during activation, achieving full softening within 10 seconds.

This example embodiment demonstrates one possible role of conductive thermoplastic elastomers for rigidity tuning in soft robotics and inflatable structures. Rather than requiring multiple air chambers and pneumatic tubing to control the bending direction, the finger has a single chamber and tube and multiple rigidity tunable elements that control the neutral axis of bending. In an alternative embodiment, replacing pneumatic tubing and valves with electrical wiring can dramatically reduce the size and weight of soft robots and allows for simpler and more size-scalable geometries.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A composite comprising:
a conductive elastomer comprising an elastomer and a conductive filler,
wherein the conductive filler is disposed within the elastomer to provide electrical conductivity,
wherein the conductive elastomer exhibits a non-activated state at a first temperature and exhibits an activated state at a second temperature; and
an isolating elastomer sealing all surfaces of the conductive elastomer,
wherein the isolating elastomer is non-conductive.

2. The composite of claim 1, wherein the conductive elastomer comprises a mix of propylene, ethylene, and structured carbon black.

3. The composite of claim 1, wherein the conductive elastomer comprises 51% propylene, 9% ethylene, and 40% structured carbon black by weight percent.

4. The composite of claim 1, wherein the conductive filler is selected from the group consisting of structured carbon black, metal powders, exfoliated graphite, and carbon nanotubes.

5. The composite of claim 1, wherein the elastomer is selected from the group consisting of block copolymer elastomers, propylene-based elastomers, propylene-ethylene copolymers, and ethylene-butene copolymers.

6. The composite of claim 1, wherein the rigidity is tunable based on the ratio of the fraction of conductive elastomer to the fraction of isolating elastomer.

7. The composite of claim 1, wherein a tensile modulus ranges from about 1 MPa in the activated state to about 100 MPa in the non-activated state.

8. The composite of claim 1, wherein the conductive filler forms a percolating network within the elastomer.

9. The composite of claim 1, wherein a rigidity change ($\Gamma$) of the composite is defined by $$\Gamma = \frac{E_{\it{eff}}^n}{E_{\it{eff}}^a} = \left(\frac{\chi}{1-\chi}\right)\frac{E_{CE}}{E_{IE}} + 1$$

where x is an area fraction of the conductive elastomer to that of the composite, $E_{CE}$ corresponds to a tensile modulus of the conductive elastomer, $E_{IE}$ corresponds to a tensile modulus of the conductive elastomer, and $E_{\it{eff}}^n$ is a tensile moduli of the composite in the non-activated state and $E_{\it{eff}}^a$ is tensile moduli of the composite in the activated state.

10. The composite of claim 1, wherein the first temperature is less than the second temperature.

11. The composite of claim 1, wherein the second temperature is a softening temperature of the elastomer.

\* \* \* \* \*